Feb. 21, 1939. W. F. BROWN 2,147,764
TRUCK BRAKE
Filed May 19, 1938
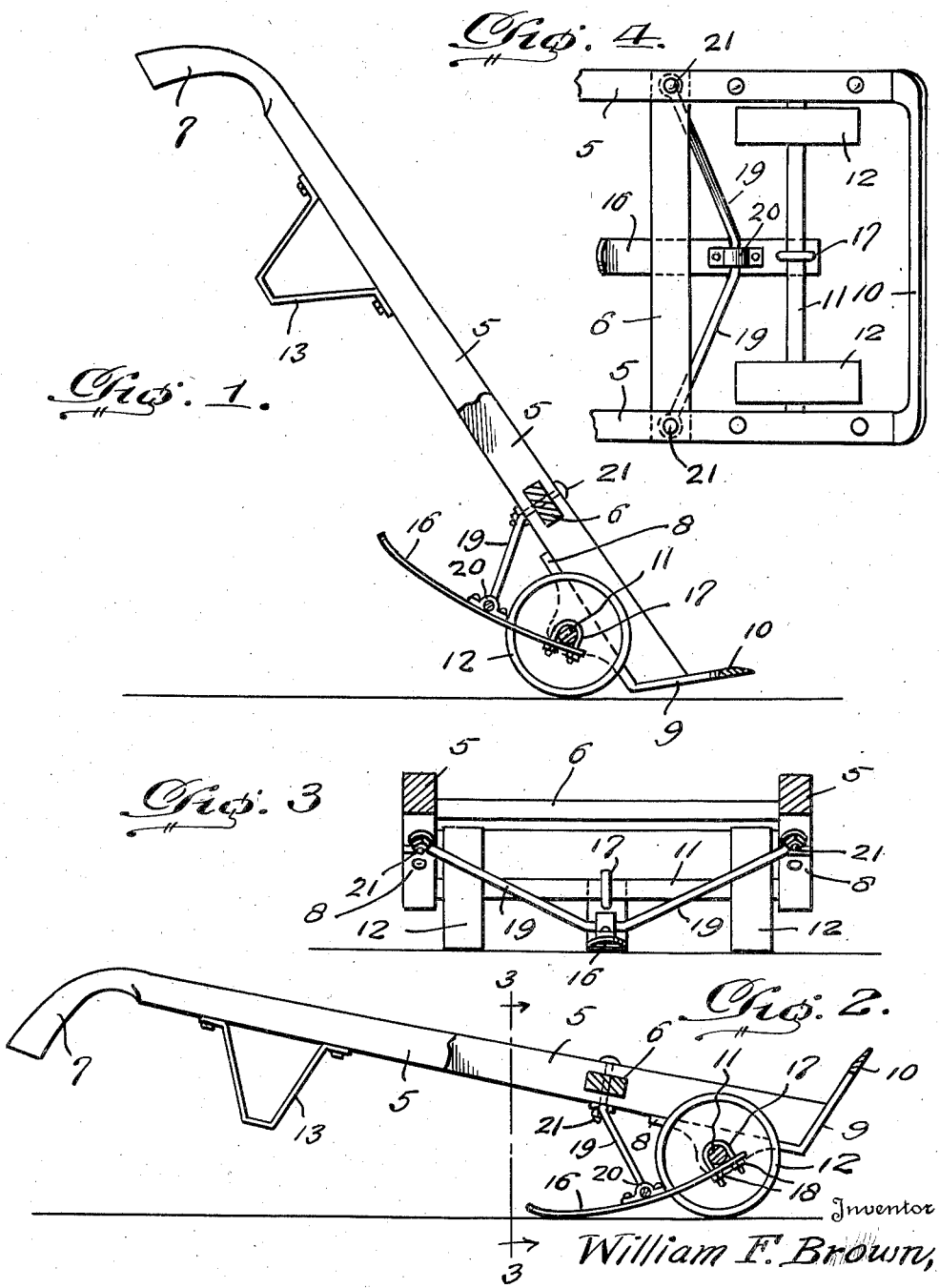
Inventor
William F. Brown,
By J. Stanley Burch
Attorney Patented Feb. 21, 1939

2,147,764

UNITED STATES PATENT OFFICE 2,147,764

TRUCK BRAKE

William F. Brown, Hanford, Calif.

Application May 19, 1938, Serial No. 208,925

2 Claims. (Cl. 280—56)

This invention relates to warehouse trucks of the two-wheeled type, and has more particular reference to an improvement in the type of brake attachment, for trucks of this kind, disclosed in my co-pending application upon Truck brake, Serial Number 177,787, filed December 2, 1937.

An important object of the present invention is to provide a brake of the above kind in which the brake shoe is simplified and braced against turning about a round truck axle when clamped to the latter.

A more specific object of the present invention is to provide a brake attachment of the above kind which is of greater simplicity and more economical to manufacture than that disclosed in my above-mentioned application, and which is just as efficient and easy to apply to conventional warehouse trucks.

Other objects will become apparent from the following description when considered in connection with the accompanying drawing, and the invention consists in the novel form, combination and arrangement of parts hereinafter claimed.

In the drawing:

Figure 1 is a view of a warehouse truck equipped with a brake attachment constructed in accordance with the present invention, said truck being partly in side elevation and partly in longitudinal section.

Figure 2 is a view similar to Figure 1 with the rear end of the truck lowered and the brake shoe engaged with the ground or floor.

Figure 3 is a transverse section on line 3—3 of Figure 2; and

Figure 4 is a top plan view of the construction shown in Figure 3.

Referring in detail to the drawing, the present brake attachment is shown as applied to a conventional warehouse truck of the two-wheel type including spaced longitudinal side rails 5 rigidly connected at intervals by cross bars 6 and terminating at their rear ends in handles 7. To the forward ends of the side rails 5 are secured plates 8 provided with flanges 9 that extend upwardly over the ends of the rails 5 and are connected at their upper projecting ends by a transverse bar 10. The plates 8 are provided with suitable bearings to receive the ends of an axle 11 upon which the truck wheels 12 are journaled. The transverse bar 10 is adapted for engagement under a box or other object to facilitate loading of said object upon the truck in the usual manner. Ordinarily, trucks of this type are provided with legs 13, one carried by each side rail 5, for engaging the floor or ground to support the rear end of the truck with the rails 5 substantially horizontally disposed, when the truck is not in use or being moved about on the wheels 12.

My improved brake attachment includes a brake shoe 16 comprising a strip of flat spring metal provided at one of its ends with a pair of openings for reception of the stems of a U-bolt 17 which is placed over the axle 11 and has nuts 18 threaded thereon beneath the forward end of shoe 16, whereby the latter is firmly and rigidly clamped to the axle 11 intermediate the ends of the latter. In this way, the brake shoe 16 is attached to the truck so as to extend downwardly and rearwardly beneath the axle 11. The shoe 16 is preferably curved longitudinally in a downward direction so as to form an efficient brake shoe for engagement with the ground or floor when the rear end of the truck is lowered to a nearly horizontal position as shown in Figure 2. Thus, lowering of the rear end of the truck brings the brake shoe 16 in contact with the floor or ground and exercises a dragging or braking action thereon proportional to the downward pressure on the handles 7, the slight tendency of the brake shoe to glide preventing undue shock as the result of the brake. The rear ground-engaging portion of the brake shoe 16 will yield so as to provide yielding pressure against the ground or floor to afford gradual application of the brake. Obviously, the arrangement is also such that when the rear end of the truck is raised to a nearly upright position such as is ordinarily had in moving the truck from place to place or transporting a load as shown in Figure 1, the brake shoe 16 will be elevated above and disengaged from the ground or floor so as to not impede the movement of the truck.

In order to prevent undue yielding of the brake shoe 16, and to prevent the latter from turning about the round axle 11, a U-shaped brace 19 is arranged transversely of the truck and attached at 20 intermediate its ends to the intermediate portion of said shoe 16, the end portions of brace 19 extending upwardly and rearwardly and having their terminal ends bolted at 21 to the side rails 5 of the truck. This enables use of the U-bolt 17 for attaching the brake shoe to axle 11 even though the latter is round, and eliminates the need for bolts extending through holes in the axle.

From the foregoing description, it is believed that the construction and manner of use, as well as the advantages of the present invention will be readily understood and appreciated by those skilled in the art.

What I claim as new is:

1. The combination with a warehouse truck including rigidly connected side rails mounted at their forward ends upon a transverse axle provided with supporting wheels, of a brake attachment comprising a brake shoe consisting of a strip of flat spring metal provided at one of its ends with a pair of openings, a U-bolt placed over the axle and having its stems passing through said openings in the brake shoe, nuts threaded upon the stems of said U-bolt for clamping the brake shoe to the axle, said brake shoe extending rearwardly and downwardly from the axle in position to engage the ground or floor when the rear ends of the side rails are lowered to a nearly horizontal position, and a U-shaped brace arranged transversely of the truck and attached intermediate its ends to the intermediate portion of said brake shoe, the end portions of said brace extending upwardly and rearwardly and having their terminal ends secured to the side rails of the truck.

2. The combination with a warehouse truck including rigidly connected side rails mounted at their forward ends upon a round transverse axle provided with supporting wheels, of a brake attachment comprising a brake shoe consisting of a strip of flat spring metal, a U-bolt passing around the axle and extending through one end of said brake shoe for securing the latter to said axle so that said shoe extends rearwardly and downwardly in position to engage the ground or floor when the rear ends of the side rails are lowered to a nearly horizontal position, and a U-shaped brace for preventing turning of the brake shoe about the axle, said brace being arranged transversely of the truck and attached intermediate its ends to the intermediate portion of the brake shoe, the end portions of the brace extending upwardly and rearwardly and having their terminal ends bolted to the side rails of the truck.

WILLIAM F. BROWN.